(12) United States Patent
Reverdy

(10) Patent No.: US 6,731,107 B2
(45) Date of Patent: May 4, 2004

(54) STAR-CONNECTED SENSOR

(75) Inventor: Francois Reverdy, Saint Martin Bellevue (FR)

(73) Assignee: Alcatel, Paris (FR)

( * ) Notice: Subject to any disclaimer, the term of this patent is extended or adjusted under 35 U.S.C. 154(b) by 116 days.

(21) Appl. No.: 10/030,709

(22) PCT Filed: May 11, 2001

(86) PCT No.: PCT/FR01/01420

§ 371 (c)(1),
(2), (4) Date: Jan. 14, 2002

(87) PCT Pub. No.: WO01/88466

PCT Pub. Date: Nov. 22, 2001

(65) Prior Publication Data

US 2002/0105338 A1 Aug. 8, 2002

(30) Foreign Application Priority Data

May 12, 2000 (FR) .............................. 00/06140

(51) Int. Cl.⁷ .............................. H01F 5/00; G01B 7/30
(52) U.S. Cl. .............................. 324/207.16; 324/207.25
(58) Field of Search ............................ 324/207.16, 545, 324/207.11, 207.13, 207.15, 207.25, 219, 239, 241, 654, 233; 310/90.5, 168; 318/647

(56) References Cited

U.S. PATENT DOCUMENTS

| | | | |
|---|---|---|---|
| 3,760,392 A | * | 9/1973 | Stich ..................... 340/870.37 |
| 4,114,960 A | | 9/1978 | Habermann et al. |
| 4,199,718 A | | 4/1980 | Ikeda et al. |
| 5,777,414 A | * | 7/1998 | Conrad ..................... 310/90.5 |
| 6,297,574 B1 | * | 10/2001 | Schob et al. ............... 310/90.5 |
| 2001/0010438 A1 | * | 8/2001 | Bouille et al. ............. 310/90.5 |

FOREIGN PATENT DOCUMENTS

CH          251 155 A          10/1947

OTHER PUBLICATIONS

Patent Abstracts of Japan, vol. 1996, No. 01, Jan. 31, 1996 corresponding to JP 07 238928 A (Toshiba Corp.) dated Sep. 12, 1995.

* cited by examiner

*Primary Examiner*—N. Le
*Assistant Examiner*—Amy He
(74) *Attorney, Agent, or Firm*—Sughrue Mion, PLLC

(57) ABSTRACT

In a rotary assembly comprising a rotor mounted in rotation in a stator about a mean axis of rotation, a radial position sensor comprises three induction sensors distributed in the stator substantially at 120° from one another around the rotor and equidistant from the mans axis of ration. The induction sensors are cabled in star connection with a common connection point, and are powered by a balanced three-phase sinusoidal voltage source with a neutral point. The output voltage, present between the common connection point and the neutral point of the balanced three-phase sinusoidal voltage source, is processed by signal processing means which determine its amplitude and its phase relative to the voltage delivered by the balanced three-phase sinusoidal voltage source. Thus, from only three sensors, two signals are obtained constituting the amplitude image and the angular position of the radial displacement of the rotor gravity axis in the stator.

12 Claims, 6 Drawing Sheets

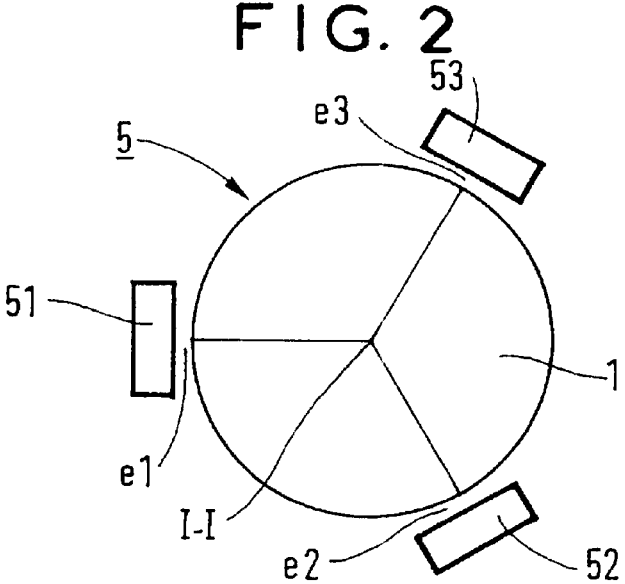
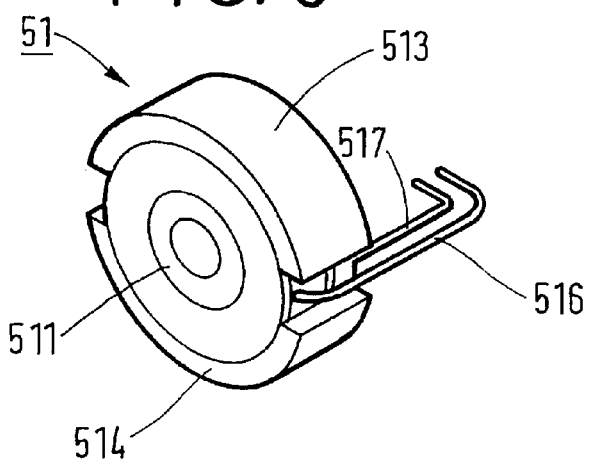
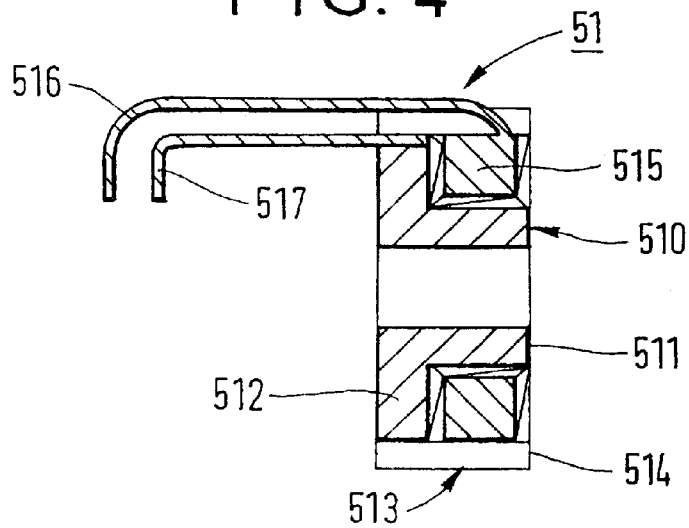

STAR-CONNECTED SENSOR

TECHNICAL FIELD OF THE INVENTION

The present invention relates to rotary assemblies comprising a rotor mounted to rotate in a stator about a mean axis of rotation, and in which there is a need to detect the radial position of the rotor within the stator.

Detecting the radial position of the rotor makes it possible, for example, to detect wear in the bearings carrying the rotor, as described in document U.S. Pat. No. 4,199,718 A. In that document, the detector for detecting the radial position of the rotor comprises three sensors distributed in the stator at substantially 120° from one another around the rotor and at equal distances from the mean axis of rotation of the rotor. Each sensor is a coil which produces an electric voltage at its terminals as a function of a magnetic field generated by a plurality of magnetic poles carried by the rotor. The coils are connected in series so as to generate a periodic voltage signal which, on processing, enables the radial position of the rotor within the stator to be evaluated. That structure requires the rotor to be provided with a multi-pole segment for generating the magnetic fields that are picked up by the coils. Although suitable for monitoring wear in mechanical bearings, that apparatus would not be suitable for controlling magnetic bearings in which supporting electromagnets generate a magnetic field that would interfere with the operation of the sensors.

Document CH 251 155 A describes apparatus for monitoring concentricity of a wire in its coating. A magnetic circuit having three radial branches in a star configuration interconnected by a peripheral ring carries three coils that are star-connected to a common connection point. The coils are fed from a three-phase voltage source having a neutral connection. A voltage sensor, connected between neutral and the common connection point, delivers a signal which is proportional to the amplitude of the eccentricity of the wire. That apparatus does not measure and could not be used for measuring the instantaneous radial position of a rotary shaft.

For the purpose of controlling a magnetic bearing, a detector is known for detecting the radial position of a rotor as described in document U.S. Pat. No. 4,114,960 A, which detector has at least two pairs of inductive sensors. The sensors in one pair of sensors are placed in positions that are diametrally opposite about the rotor, and they are electrically connected in series to be fed with a sinewave voltage. The output terminal from the sensor is connected to the point where the sensors are interconnected, and produces an electrical signal that is the image of rotor displacement along the diametral direction between the two sensors. Detecting the radial position of the rotor in any direction around the mean axis of rotation requires at least two pairs of sensors, e.g. directed along two perpendicular diameters.

SUMMARY OF THE INVENTION

The problem proposed by the invention is that of designing a novel detector structure for detecting the radial position of the rotor in the stator, using a small number of sensors and using sensors that are relatively insensitive to surrounding magnetic induction.

The idea on which the invention is based is to use three inductive sensors that are connected and fed in suitable manner, thereby reducing the number of sensors, reducing the wiring needed to connect them, reducing the connections and connectors that are required, and limiting the number of magnetic parts that are necessary to hold the sensors mechanically in the stator.

Another object of the invention is to facilitate processing of the output signal for evaluating the radial position of the rotor, and enabling the signal to be used downstream, e.g. to control supporting electromagnets in magnetic bearings for the purpose of keeping the rotor centered.

To achieve these objects, and others, the invention provides a rotary assembly comprising a rotor mounted to rotate in a stator about a mean axis of rotation, the assembly further comprising a detector for detecting the radial position of the rotor within the stator, itself comprising three sensors distributed in the stator at substantially 120° from one another about the rotor and at equal distances from the mean axis of rotation; according to the invention:

the sensors are inductive sensors placed facing a segment of the rotor that is made of magnetic material;

a balanced three-phase sinusoidal voltage source having a neutral point feeds the inductive sensors which are wired in a star configuration;

means sense the output voltage between the neutral point of the balanced three-phase voltage source and the connection point common to the star-connected inductive sensors, and deduce therefrom the radial position of the rotor within the stator.

An application of the invention lies in magnetic bearing control systems. Under such circumstances, the rotary assembly comprises at least one magnetic bearing having supporting electromagnets fed by a control circuit driven by the output voltage of the corresponding radial position detector.

In this application, a particularly advantageous solution consists in using a magnetic bearing comprising three supporting electromagnets distributed around the rotor on three axes that are at 120° to one another.

In which case, the inductive sensors can advantageously be offset angularly between the angular positions occupied by the supporting electromagnets.

Because there are at least three inductive sensors for a magnetic bearing having three supporting electromagnets, it becomes possible to engage the inductive sensors between the supporting electromagnets of the same magnetic bearing so that the assembly occupies only a small amount of space axially.

A single rotor is preferably provided with two magnetic bearings that are longitudinally spaced apart from each other.

In a first embodiment, the output voltage is processed by signal processing means to produce an amplitude signal and a phase signal relative to the voltage delivered by the balanced three-phase voltage source, the amplitude signal constituting a signal that is an image of the amplitude of the radial displacement of the gravity axis of the rotor relative to the mean axis of rotation, and the phase signal constituting a signal that is the image of the angular position of the gravity axis of the rotor about the mean axis of rotation relative to the inductive sensors. Thus, using only three sensors, two signals are obtained constituting the image of the amplitude and the angular position of the radial displacement of the gravity axis of the rotor within the stator.

In a preferred implementation of this first embodiment, the signal processing means comprise:

an amplitude-measuring circuit connected to the output of the radial position detector and producing an amplitude signal proportional to the amplitude of the output voltage of the radial amplitude detector;

a phase-measuring circuit connected to the output of the radial position detector, and producing a phase signal proportional to the phase offset between the output voltage and one of the three sinewave voltages feeding the star-connected inductive sensors;

digital processing means receiving the amplitude signal and the phase signal, and producing the signals for controlling the feed to the supporting electromagnets seeking to keep the gravity axis of the rotor centered relative to the mean axis of rotation in the stator.

In a second embodiment, the output voltage is processed by signal processing means producing at least two amplitude signals constituting images of respective instantaneous displacement components of the center of gravity of the rotor along two different fixed radial directions of the stator about the mean axis of rotation.

In a preferred implementation of this second embodiment, the signal processing means comprise:

a first amplitude-measuring circuit having a first input connected to the output of the radial position detector and having a second input connected to a first phase of the balanced three-phase sinusoidal voltage source, and outputing a first amplitude signal proportional to the mean value of the output voltage as computed over a sample that is synchronous with said first phase of the balanced three-phase sinusoidal voltage source;

a second amplitude-measuring circuit having a first input connected to the output of the radial position detector and having a second input connected to another phase of the balanced three-phase sinusoidal voltage source, for example the third phase, and outputing a second amplitude signal proportional to the mean value of the output voltage computed during a sample that is synchronous with said other phase of the balanced three-phase sinusoidal voltage source;

digital processing means receiving the two amplitude signals and producing signals for controlling the feed to the supporting electromagnets seeking to keep the gravity axis of the rotor centered relative to the mean axis of rotation within the stator.

A particularly advantageous application of the invention lies in making a rotor and a stator for a vacuum pump.

BRIEF DESCRIPTION OF THE DRAWINGS

Other objects, characteristics, and advantages of the present invention appear from the following description of particular embodiments made with reference to the accompanying figures, in which:

FIG. 2 is a diagram showing the distribution of the sensors around a rotor, in a radial position detector of the invention;

FIG. 3 is a perspective view of an inductive sensor suitable for use in a radial position detector of the present invention;

FIG. 4 is a longitudinal section of the inductive sensor of FIG. 3;

DESCRIPTION OF THE PREFERRED EMBODIMENTS

Figure 1:
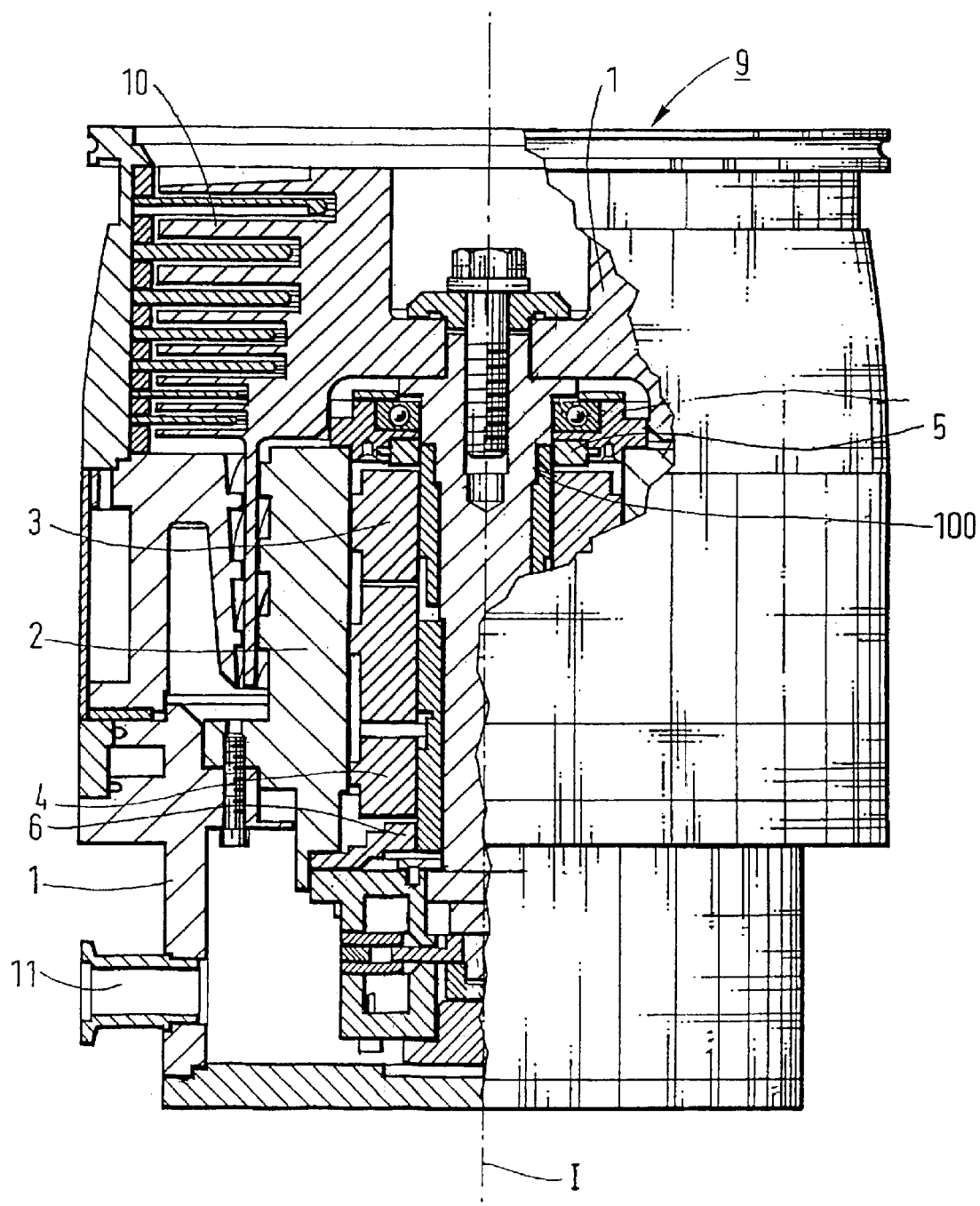
FIG. 1 is a longitudinal section through a rotary assembly having a rotor held within a stator by magnetic bearings and constituting a vacuum pump.

FIG. 1 shows an application of the present invention to making a vacuum pump comprising a rotor 1 mounted in a stator 2 to rotate about a mean axis of rotation I—I. The rotor 1 is held in position centered on the mean axis of rotation I—I by magnetic bearings 3 and 4 that are longitudinally spaced apart from each other, each comprising supporting electromagnets fed by a control circuit driven by the output voltage from a respective radial position detector 5 or 6.

The function of each radial position detector 5 or 6 is to detect the radial displacement of the rotor 1 away from its mean axis of rotation I—I so as to control the feed to the electromagnets of the corresponding magnetic bearing 3 or 4 to generate magnetic forces tending to oppose said radial displacement of the rotor 1 and thus return it to a centered position on the mean axis of rotation I—I.

As shown in FIG. 2, a radial position detector such as the detector 5 of the invention comprises three inductive sensors 51, 52, and 53, placed in the stator 2 at substantially 120° from one another around the rotor 1 and at equal distances from the mean axis of rotation I—I. The sensors 51, 52, and 53 are inductive sensors in order to co-operate with a segment 100 (FIG. 1) of the rotor 1 which is made of magnetic material and with which they are placed in register.

Each inductive sensor can be of conventional type, comprising a magnetic circuit securely fixed to the stator 2, e.g. a U-shaped magnetic circuit of ferrite carrying a coil, and co-operating with the segment of the rotor 1 that is made of magnetic material and which closes the magnetic circuit by leaving a radial air-gap e1, e2, or e3 of small size between the U-shaped magnetic circuit carried by the stator and the segment 100 of the rotor that is made of magnetic material.

Variations in the size of the air-gap as a result of any radial movement of the rotor 1 give rise to changes in the magnetic characteristics of the magnetic circuit, and consequently modify the self-inductance of the coil wound on the U-shaped magnetic circuit.

FIGS. 3 and 4 show one possible form for the inductive sensor 51 suitable for use in the invention: the inductive sensor 51 is generally cylindrical in shape, and it can be seen to comprise a magnetic circuit made up of a central axial magnetic core 510 having a first end forming a first pole 511 and having its other end connected via a radial web 512 to a cylindrical peripheral magnetic wall 513 whose free edge forms the second pole 514. An annular induction coil 515 is engaged in the annular gap between the central axial magnetic core 510 and the peripheral magnetic wall 513. Output conductors 516 and 517 of the annular induction coil 515 can also be seen that enable electrical connection to be made therewith.

In operation, the rotor segment made of magnetic material is in register with the face comprising the poles 511 and 514 of the inductive sensor 51, thereby tending to close the magnetic circuit around the annular induction coil 515.

Reference is made to FIG. 2. The impedance of an inductive sensor 51, 52, or 53 is inversely proportional to the size of the corresponding air-gap e1, e2, or e3 separating it from the rotor 1. When the rotor 1 is radially centered within the stator 2, the air-gaps e1, e2 and e3 are identical. The impedances of the three inductive sensors 51, 52, and 53 are then equal. Under such circumstances, the star system of inductive sensors 51, 52, and 53 is in balance, such that the potential of the common connection point 54 (FIG. 5) between the sensors is equal to the potential of the neutral 56 of the balanced three-phase sinusoidal voltage source 55. In other words, the output voltage Ve is zero.

When the rotor 1 is moved, the air-gaps e1, e2, and e3 separating the rotor 1 from the stator 2 become different from one another. The impedances of the three inductive sensors 51, 52, and 53 are no longer equal, and the star system of sensors is out of balance.

As a result, the voltage at the common connection point 54 between the sensors is not zero and its amplitude is proportional to the radial displacement of the rotor and its phase is proportional to the angular displacement of the rotor as defined in a frame of reference.

Figure 5:
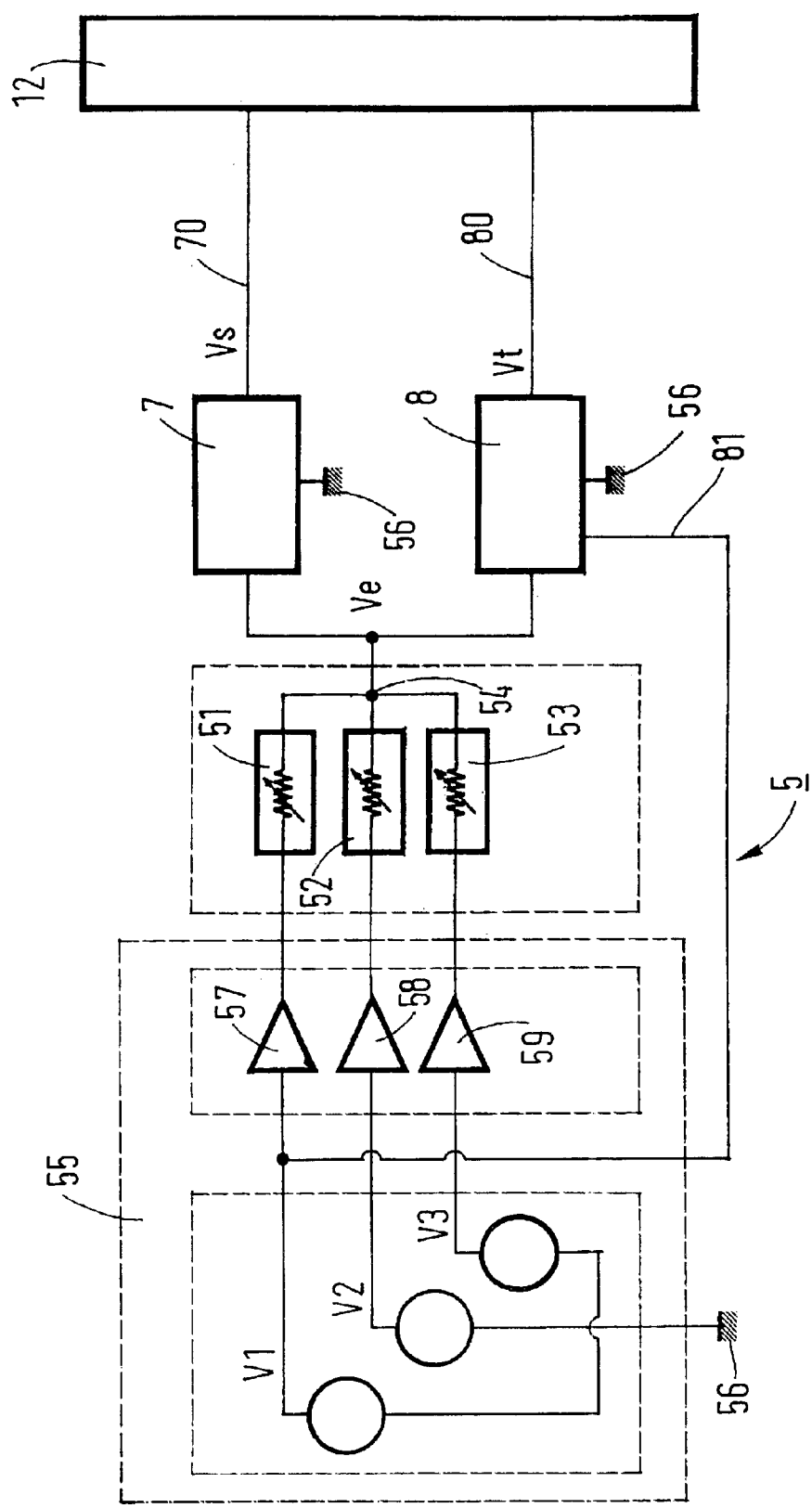
FIG. 5 is an electrical circuit diagram of a first embodiment of the invention for constituting a radial position detector.

With reference now to FIG. 5, showing a first embodiment of an electrical circuit in accordance with the invention, there can be seen the three inductive sensors 51, 52, and 53 connected electrically in a star configuration having a common connection point 54, and fed by a balanced three-phase sinusoidal voltage source 55 having a neutral point 56. The balanced three-phase sinusoidal voltage source 55 is represented in the figure by three generators each having one terminal connected to the common neutral point 56 and each having its other terminal delivering a respective voltage V1, V2, or V3 which is applied to a corresponding terminal of a respective one of the inductive sensors 51, 52, and 53 via a respective amplifier 57, 58, or 59.

The common connection point 54 of the inductive sensors 51, 52, and 53, and the neutral 56 of the balanced three-phase sinusoidal voltage source 55 constitute the two output terminals of the radial position detector 5 of the invention.

Figure 6:
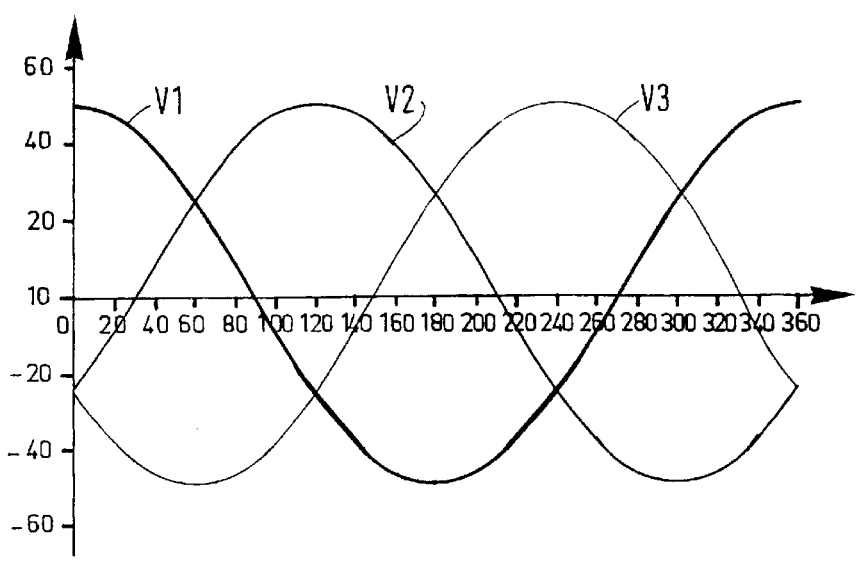
FIG. 6 shows the waveform of the three-phase sinewave voltage feeding the sensors.

FIG. 6 shows the waveforms of the three voltages V1, V2, and V3 as delivered by the balanced three-phase sinusoidal voltage source 55.

The output voltage Ve taken between the common connection point 54 and neutral 56 is processed by signal processing means that determine its amplitude and its phase relative to the voltage delivered by the balanced three-phase sinusoidal voltage source 55.

In the first embodiment shown in FIG. 5, the signal processing means comprise an amplitude-measuring circuit 7 and a phase-measuring circuit 8.

Figure 7:
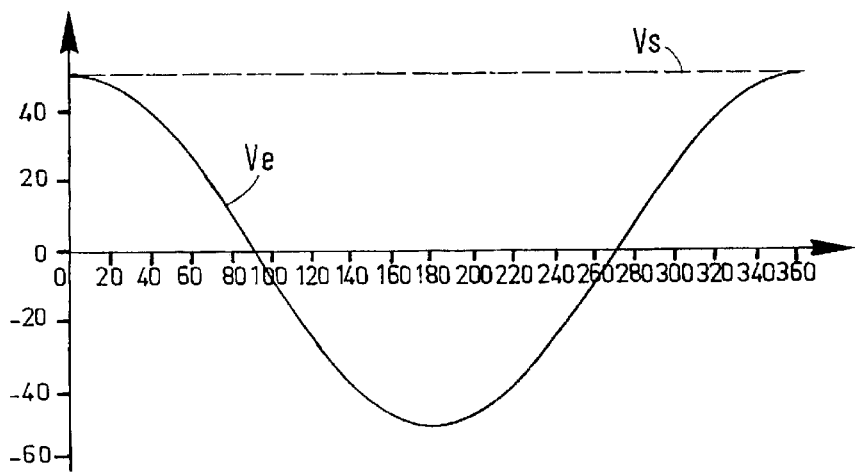
FIG. 7 shows the input and output voltages of the amplitude-measuring circuit in the FIG. 5 circuit.

The amplitude-measuring circuit 7 is connected to the output 54, 56 of the radial position detector 5 and produces on its own output 70 an amplitude signal Vs which is the image of the amplitude of the output voltage Ve from the radial position detector 5. FIG. 7 shows the waveform of the output voltage Ve of the radial position detector 5 of the invention when there is unbalance in the impedances of the inductive sensors 51, 52, and 53 as a result of the rotor 1 being off-centered: the output voltage Ve is a sinewave at the same frequency as the voltages V1, V2, and V3 of the balanced three-phase sinusoidal voltage source 55. The amplitude-measuring circuit 7 produces on its output terminal 70 a signal Vs of amplitude proportional to the amplitude of the sinusoidal output voltage Ve.

The phase-measuring circuit 8 has a first input connected to the output 54, 56 of the radial position detector 5, and has an additional input 81 connected to one of the voltages V1, V2, or V3 of the balanced three-phase sinusoidal voltage source 55, e.g. the voltage V1, to serve as a phase reference.

Figure 8:
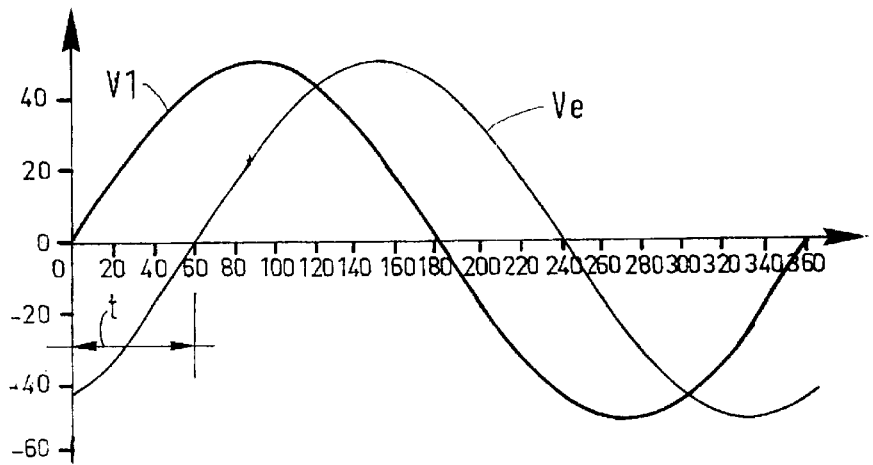
FIG. 8 shows the waveforms of the voltages at the input to the phase-measuring circuit in the FIG. 5 circuit, showing the phase offset to be measured.

As can be seen in FIG. 8, the phase-measuring circuit 8 thus receives both the sinewave voltage V1 and the output voltage Ve, both of which are sinewave voltages at the same frequency and together they present a phase offset t which is the image of the angular offset about the mean axis of rotation I—I between the first inductive sensor 51 and the measured radial displacement direction of the rotor 1. The phase-measuring circuit 8 produces a phase signal Vt on its output 80, which phase signal is the image of the phase offset t as determined in this way.

Thus, the amplitude signal Vs constitutes a signal which is the image of the amplitude of the axial displacement of the gravity axis of the rotor 1 relative to the mean axis of rotation I—I. The phase signal Vt on the output terminal 80 constitutes a signal which is the image of the angular position of the gravity axis of the rotor 1 about the mean axis of rotation I—I relative to the inductive sensors 51, 52, and 53 within the stator 2.

Digital processing means 12 receive the amplitude signal Vs and the phase signal Vt, and produce signals for controlling feeds to the supporting electromagnets for the purpose of keeping the gravity axis of the rotor 1 centered relative to the mean axis of rotation I—I in the stator 2.

It will be understood that in order to obtain good accuracy concerning detection of the radial position of the rotor 1 within the stator 2, the frequency F of the balanced three-phase sinusoidal voltage source 55 must be much higher than the rotary frequency of the rotor 1 in the stator 2. In the event of possible oscillation between the rotor 1 and the stator 2, the output voltage Ve is modulated both in amplitude and in phase, and the amplitude-measuring circuit 7 is capable of tracking variations in the amplitude of the output voltage Ve, while the phase-measuring circuit 8 is capable of tracking variations in the phase of the angular position of the rotor 1, at the speed of rotation of the rotor 1.

Figure 9:
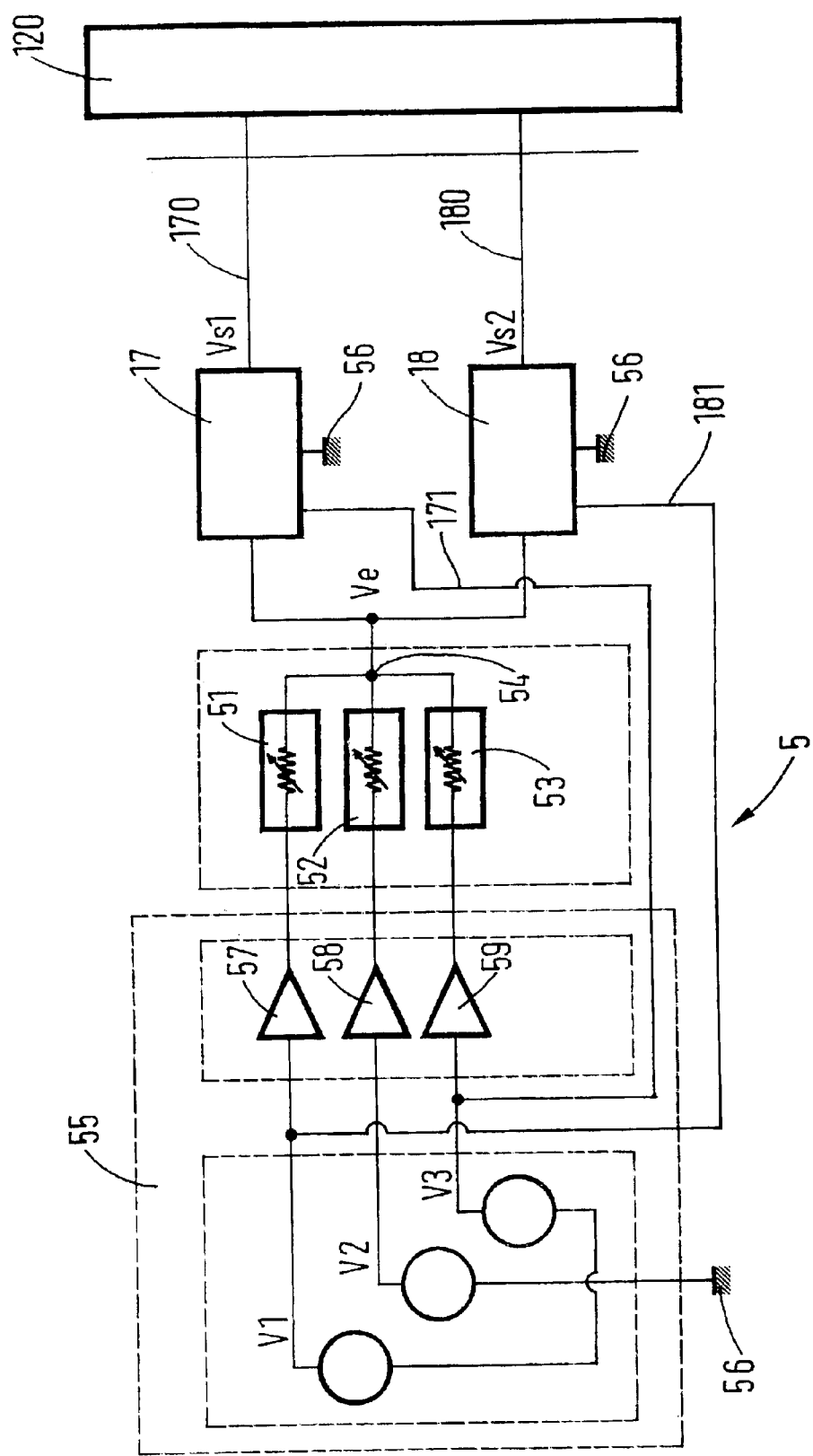
FIG. 9 is an electrical circuit diagram of a second embodiment of the invention for constituting a radial position detector.

Reference is now made to FIG. 9 showing a second embodiment of the electrical circuit of the invention.

In this second embodiment, the radial position detector 5 as described for the preceding embodiment has the same structure, and the same elements are given the same numerical references: the three voltages V1, V2, and V3 from the balanced three-phase sinusoidal voltage source 55 having a neutral 56; the three inductive sensors 51, 52, and 53; the three amplifiers 57, 58, and 59; and the output 54 from the radial position detector.

The difference lies in the signal processing means using the principle of synchronous rectification so as to obtain better sensitivity in evaluating the phase offset and the amplitude of the radial displacement of the rotor. This improved sensitivity presents the advantage of providing greater accuracy in maintaining the rotor 1 in the immediate vicinity of its ideal center position on the mean axis of rotation I—I within the stator 2.

In this embodiment, the signal processing means comprise a first amplitude-measuring circuit 17 having a first input connected to the output 54, 56 of the radial position detector 5 and having a second input 171 connected to a first phase V1 of the balanced three-phase sinusoidal voltage source 55. The first amplitude-measuring circuit 17 produces on its output 170 a first signal Vs1 of amplitude proportional to the mean value of the output voltage Ve as computed during a sample that is synchronous with said first phase V1 of the balanced three-phase sinusoidal voltage source 55.

Figure 10:
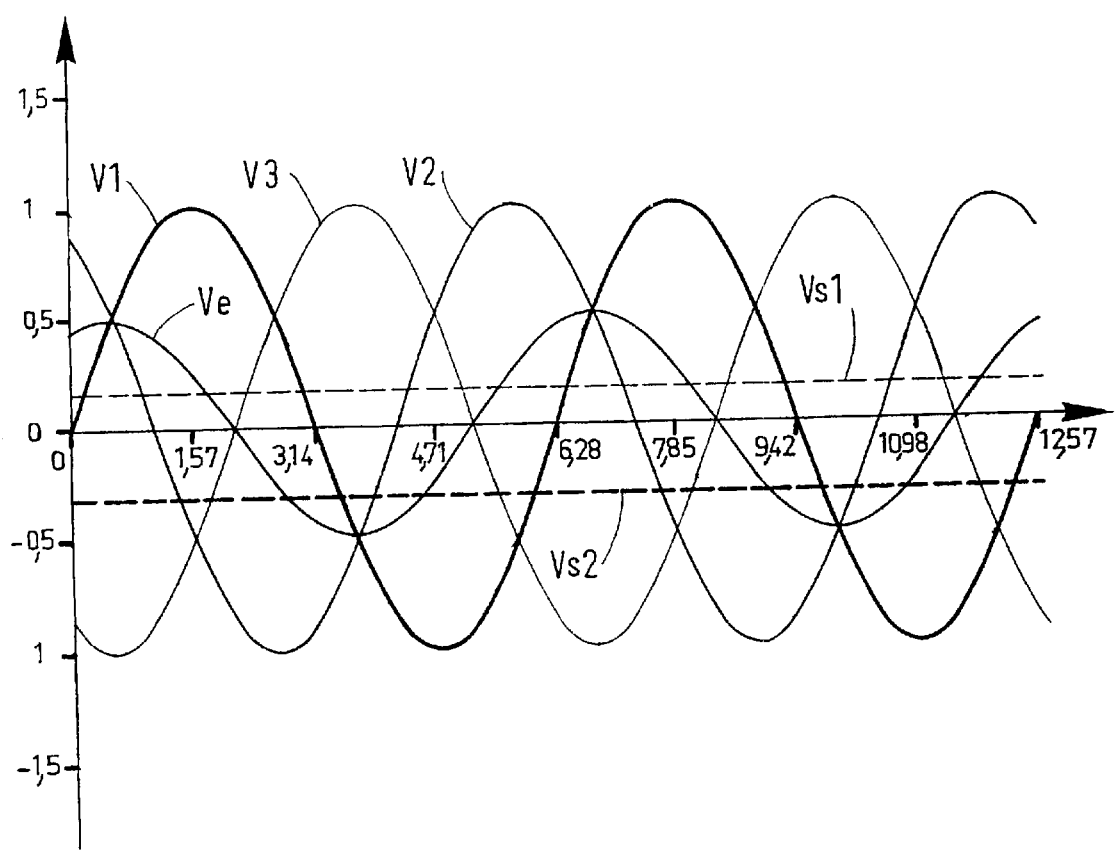
FIG. 10 is a timing diagram showing the respective waveforms of the signals that enable position to be computed in the FIG. 9 circuit.

To understand this operation, reference should be made to FIG. 10 which shows the respective waveforms of the three phases V1, V2, and V3 of the balanced three-phase sinusoidal voltage source 55, and the output voltage Ve from the radial position detector 5. The waveforms are sinewaves, and the output voltage Ve is offset relative to the voltages V1, V2, and V3 by an offset which depends on the angular position of the center of gravity of the rotor relative to the stator. In FIG. 10, there can be seen an output voltage Ve which corresponds in this example to a peak voltage of 0.5 volts and to a phase offset of 60° relative to the voltage V1, i.e. relative to the position of the sensor 51.

By way of example, the first amplitude signal Vs1 can be computed on the basis of the mean value of the voltage Ve during a positive half-cycle of the first phase voltage V1.

In similar manner, the signal processing means comprise a second amplitude-measuring circuit 18 having a first input connected to the output 54, 56 of the radial position detector 5 and having a second input 181 connected to another phase of the balanced three-phase sinusoidal voltage source 55, e.g. the third phase V3. The second amplitude-measuring circuit 18 produces on its output 180 a second signal Vs2 of amplitude proportional to the mean value of the output voltage Ve as computed during a sample that is synchronous with said third phase V3 of the balanced three-phase sinusoidal voltage source 55.

Referring again to FIG. 10, the second amplitude signal Vs2 can be calculated, for example, as the mean value of the voltage Ve taken during the positive half-cycle of the voltage V3 of the third phase. In the example shown in the figure, the output voltage Ve is in phase opposition with the voltage V3.

In this way, the first amplitude signal Vs1 constitutes a signal which is the image of the instantaneous component of the displacement of the center of gravity of the rotor 1 in the fixed radial direction of the first sensor 51 within the stator 2, while the second amplitude signal Vs2 is the image of the component of the instantaneous displacement of the center of gravity of the rotor 1 in the fixed radial direction of the third sensor 53 within the stator 2.

With reference again to FIG. 9, digital processing means 120 receive the two amplitude signals Vs1 and Vs2, and produce the signals for controlling the feed to the supporting electromagnets seeking to keep the gravity axis of the rotor 1 centered relative to the mean axis of rotation I—I within the stator 2.

With reference again to FIG. 1, it can be seen that the magnetic bearing 3 is offset axially relative to the radial position detector 5. Under such circumstances, the angular positions of the inductive sensors constituting the radial position detector 5 can be arbitrary relative to the angular positions of the magnets constituting the magnetic bearing 3.

Nevertheless, it is advantageous for the magnetic bearing 3 to comprise three supporting electromagnets, and for the three inductive sensors forming the radial position detector 5 to be offset angularly inbetween the angular positions occupied by the supporting electromagnets of the magnetic bearing 3.

Under such circumstances, it will be understood that the three inductive sensors can advantageously be engaged between the three supporting electromagnets, so that the assembly occupies a small amount of space along the length of the rotor, with the radial position detector 5 then being interleaved within the magnetic bearing 3.

In the embodiment shown in this same FIG. 1, the rotary assembly of the invention is a vacuum pump, in which there can be seen an axial suction inlet 9, suction fins 10 of the rotor 1, and a radial delivery outlet 11. The rotor 1 rotates at high speed, and it is held by the magnetic bearings 3 and 4 within the stator 2.

The present invention is not limited to the embodiments described in particular, but it covers various generalizations and variants that are within the competence of the person skilled in the art.

What is claimed is:

1. A rotary assembly comprising a rotor mounted to rotate in a stator about a mean axis of rotation, and comprising a detector for detecting the radial position of the rotor within the stator, itself comprising three sensors distributed in the stator at substantially 120° from one another about the rotor and at equal distances from the mean axis of rotation, wherein:

the sensors are inductive sensors placed facing a segment of the rotor that is made of magnetic material;

a balanced three-phase sinusoidal voltage source having a neutral point feeds the inductive sensors which are wired in a star configuration;

means sense the output voltage between the neutral point of the balanced three-phase voltage source and the connection point common to the star-connected inductive sensors, and deduce therefrom the radial position of the rotor within the stator.

2. A rotary assembly according to claim 1, comprising at least one magnetic bearing having supporting electromagnets fed by a control circuit driven by the output voltage of the corresponding radial position detector.

3. A rotary assembly according to claim 2, wherein the magnetic bearing comprises three supporting electromagnets.

4. A rotary assembly according to claim 3, wherein the inductive sensors are angularly offset between the angular positions occupied by the supporting electromagnets.

5. A rotary assembly according to claim 4, wherein the inductive sensors are engaged between the supporting electromagnets of a single magnetic bearing.

6. A rotary assembly according to claim 2 comprising two magnetic bearings spaced apart longitudinally from each other.

7. A rotary assembly according to claim 2, wherein the output voltage is processed by signal processing means to produce an amplitude signal and a phase signal relative to the voltage delivered by the balanced three-phase voltage source, the amplitude signal constituting a signal that is an image of the amplitude of the radial displacement of the gravity axis of the rotor relative to the mean axis of rotation, the phase signal constituting a signal that is the image of the angular position of the gravity axis of the rotor about the mean axis of rotation relative to the inductive sensors.

8. A rotary assembly according to claim 7, wherein the signal processing means comprise:

an amplitude-measuring circuit connected to the output of the radial position detector and producing an amplitude signal proportional to the amplitude of the output voltage of the radial amplitude detector;

a phase-measuring circuit connected to the output of the radial position detector, and producing a phase signal proportional to the phase offset between the output voltage and one of the three sinewave voltages feeding the star-connected inductive sensors;

digital processing means receiving the amplitude signal and the phase signal, and producing the signals for controlling the feed to the supporting electromagnets seeking to keep the gravity axis of the rotor centered relative to the mean axis of rotation on the stator.

9. A rotary assembly according to claim 2, wherein the output voltage is processed by signal processing means producing at least two amplitude signals constituting images of respective instantaneous displacement components of the center of gravity of the rotor along two different fixed radial directions of the stator about the mean axis of rotation.

10. A rotary assembly according to claim 9, wherein the signal processing means comprise:

a first amplitude-measuring circuit having a first input connected to the output of the radial position detector and having a second input connected to a first phase of the balanced three-phase sinusoidal voltage source, and producing on its output a first amplitude signal proportional to the mean value of the output voltage as computed over a sample that is synchronous with said first phase of the balanced three-phase sinusoidal voltage source;

a second amplitude-measuring circuit having a first input connected to the output of the radial position detector and having a second input connected to another phase of the balanced three-phase sinusoidal voltage source, and producing on its output a second amplitude signal proportional to t he mean value of the output voltage computed during a sample that is synchronous with said other phase of the balanced three-phase sinusoidal voltage source;

digital processing means receiving the two amplitude signals and producing signals for controlling the feed to the supporting electromagnets seeking to keep the gravity axis of the rotor centered relative to the mean axis of rotation within the stator.

11. A rotary assembly according to claim 1 in which the rotor and the stator constitute a vacuum pump.

12. A rotary assembly according to claim 1, wherein the frequency of the balanced three-phase sinusoidal voltage source is much higher than the rotary frequency of the rotor in the stator.

* * * * *